(12) United States Patent
Kirmse et al.

(10) Patent No.: US 8,762,493 B1
(45) Date of Patent: Jun. 24, 2014

(54) HIERARCHICAL SPATIAL DATA STRUCTURE AND 3D INDEX DATA VERSIONING FOR GENERATING PACKET DATA

(75) Inventors: Andrew Kirmse, Emerald Hills, CA (US); Emil C. Praun, Fremont, CA (US); Olivier Bailly, Oakland, CA (US)

(73) Assignee: Google Inc., Mountain View, CA (US)

( * ) Notice: Subject to any disclaimer, the term of this patent is extended or adjusted under 35 U.S.C. 154(b) by 2117 days.

(21) Appl. No.: 11/473,461

(22) Filed: Jun. 22, 2006

(51) Int. Cl.
*G06F 15/16* (2006.01)
*G06K 9/54* (2006.01)
*G06K 9/60* (2006.01)

(52) U.S. Cl.
USPC .......................................... 709/218; 382/305

(58) Field of Classification Search
USPC .................................. 709/218; 382/154, 305
See application file for complete search history.

(56) References Cited

U.S. PATENT DOCUMENTS

| | | | |
|---|---|---|---|
| 2,818,211 A | 12/1957 | Macklem | |
| 5,030,117 A | 7/1991 | Delorme | |
| 5,581,637 A | 12/1996 | Cass et al. | |
| 5,652,717 A | 7/1997 | Miller et al. | |
| 5,778,092 A | 7/1998 | MacLeod et al. | |
| 5,796,868 A | 8/1998 | Dutta-Choudhury | |
| 5,987,189 A | 11/1999 | Schmucker et al. | |
| 6,005,978 A | 12/1999 | Garakani | |
| 6,075,567 A | 6/2000 | Ohnishi | |
| 6,075,905 A | 6/2000 | Herman et al. | |
| 6,188,804 B1 | 2/2001 | Weldy et al. | |
| 6,313,837 B1 * | 11/2001 | Assa et al. | 345/420 |
| 6,326,965 B1 * | 12/2001 | Castelli et al. | 345/420 |
| 6,359,617 B1 | 3/2002 | Xiong | |
| 6,363,392 B1 * | 3/2002 | Halstead et al. | 1/1 |
| 6,434,265 B1 | 8/2002 | Xiong et al. | |
| 6,453,233 B1 | 9/2002 | Kato | |
| 6,466,210 B1 | 10/2002 | Carlsen et al. | |
| 6,470,265 B1 | 10/2002 | Tanaka | |
| 6,470,344 B1 * | 10/2002 | Kothuri et al. | 707/100 |
| 6,493,021 B1 | 12/2002 | Rouge et al. | |
| 6,526,176 B1 * | 2/2003 | Kovacevic et al. | 382/240 |
| 6,591,004 B1 | 7/2003 | VanEssen et al. | |
| 6,625,611 B1 * | 9/2003 | Teig et al. | 707/102 |
| 6,636,215 B1 | 10/2003 | Greene | |
| 6,646,639 B1 | 11/2003 | Greene et al. | |
| 6,684,219 B1 * | 1/2004 | Shaw et al. | 707/103 R |
| 6,694,064 B1 | 2/2004 | Benkelman | |
| 6,720,997 B1 | 4/2004 | Horie et al. | |
| 6,732,120 B1 * | 5/2004 | Du | 707/104.1 |

(Continued)

OTHER PUBLICATIONS

Samet, Hanan et al., "Hierarchical Spatial Data Structures," Proc. of 1st Symp. on Large SpatialDatabases, Lecture Notes in Computer Science 409, Springer-Verlag, 1989, pp. 193-212.*

(Continued)

*Primary Examiner* — Glenton B Burgess
*Assistant Examiner* — Bejamin Ailes
(74) *Attorney, Agent, or Firm* — Fish & Richardson P.C.

(57) ABSTRACT

The disclosed implementations are related to hierarchical spatial data structures with 3D data versioning for generating packet data. The packet data can be used by a client application to determine the availability of data at certain levels of a hierarchical spatial data structure. A 3D index table storing data version information can be used to support data updates and to ensure that a consistent view of data is provided to clients without suffering interruptions in service.

17 Claims, 8 Drawing Sheets

(56) References Cited

U.S. PATENT DOCUMENTS

| | | | |
|---|---|---|---|
| 6,735,348 B2 | 5/2004 | Dial, Jr. et al. | |
| 6,757,445 B1 | 6/2004 | Knopp | |
| 6,766,248 B2 | 7/2004 | Miyahara | |
| 6,768,487 B1 | 7/2004 | Greene | |
| 6,842,638 B1 | 1/2005 | Suri et al. | |
| 6,882,853 B2* | 4/2005 | Meyers | 455/457 |
| 6,917,711 B1* | 7/2005 | Wang et al. | 382/232 |
| 6,985,903 B2 | 1/2006 | Biacs | |
| 6,985,929 B1* | 1/2006 | Wilson et al. | 709/217 |
| 7,006,110 B2 | 2/2006 | Crisu et al. | |
| 7,023,437 B1 | 4/2006 | Voorhies et al. | |
| 7,103,237 B2* | 9/2006 | Labelle | 382/305 |
| 7,138,998 B2* | 11/2006 | Forest et al. | 345/423 |
| 7,190,839 B1* | 3/2007 | Feather et al. | 382/240 |
| 7,248,965 B2* | 7/2007 | Tanizaki et al. | 701/208 |
| 7,298,733 B2* | 11/2007 | Sakai et al. | 370/352 |
| 7,298,869 B1 | 11/2007 | Abernathy | |
| 7,439,969 B2* | 10/2008 | Chithambaram et al. | 345/418 |
| 7,483,025 B2* | 1/2009 | Roy et al. | 345/440 |
| 7,490,084 B2* | 2/2009 | Kothuri et al. | 707/8 |
| 7,519,603 B2* | 4/2009 | Parker | 707/100 |
| 7,552,008 B2* | 6/2009 | Newstrom et al. | 701/207 |
| 7,561,156 B2* | 7/2009 | Levanon et al. | 345/428 |
| 7,689,621 B1* | 3/2010 | Huber et al. | 707/743 |
| 8,018,458 B2* | 9/2011 | Peterson | 345/428 |
| 8,400,451 B2* | 3/2013 | Peterson | 345/428 |
| 2001/0039487 A1* | 11/2001 | Hammersley et al. | 703/2 |
| 2002/0101438 A1 | 8/2002 | Ham et al. | |
| 2002/0141640 A1 | 10/2002 | Kraft | |
| 2002/0163582 A1 | 11/2002 | Gruber et al. | |
| 2003/0007078 A1 | 1/2003 | Feldis | |
| 2003/0040970 A1* | 2/2003 | Miller | 705/26 |
| 2003/0114173 A1 | 6/2003 | Carroll | |
| 2003/0179301 A1 | 9/2003 | Feldis et al. | |
| 2003/0220981 A1* | 11/2003 | Nakamura et al. | 709/217 |
| 2004/0021770 A1 | 2/2004 | Krill | |
| 2004/0057633 A1 | 3/2004 | Mai et al. | |
| 2004/0081355 A1 | 4/2004 | Takahashi | |
| 2004/0095343 A1* | 5/2004 | Forest et al. | 345/419 |
| 2004/0204849 A1 | 10/2004 | Shipley et al. | |
| 2004/0234162 A1 | 11/2004 | Jalobeanu et al. | |
| 2004/0252880 A1 | 12/2004 | Takizawa et al. | |
| 2005/0041842 A1* | 2/2005 | Frakes et al. | 382/128 |
| 2005/0091223 A1* | 4/2005 | Shaw et al. | 707/100 |
| 2005/0109363 A1* | 5/2005 | Matsuoka | 132/298 |
| 2005/0265631 A1 | 12/2005 | Mai et al. | |
| 2005/0270311 A1 | 12/2005 | Rasmussen et al. | |
| 2006/0143202 A1* | 6/2006 | Parker | 707/101 |
| 2006/0184519 A1* | 8/2006 | Smartt | 707/3 |
| 2006/0206264 A1 | 9/2006 | Rasmussen | |
| 2006/0222079 A1* | 10/2006 | Park et al. | 375/240.16 |
| 2006/0265350 A1* | 11/2006 | Klein | 707/1 |
| 2007/0182734 A1* | 8/2007 | Levanon et al. | 345/420 |
| 2007/0276970 A1 | 11/2007 | Werner et al. | |
| 2009/0074275 A1* | 3/2009 | O Ruanaidh | 382/128 |
| 2012/0078723 A1* | 3/2012 | Stewart | 705/14.58 |

OTHER PUBLICATIONS

Wei, Zu-Kuan et al., "Efficient Spatial Data Transmission in Web-Based GIS" 1999, WIDM '99 Proceedings of the 2nd International workshop on Web information and data management, pp. 38-42.*

Samet, Hanan, "Spatial Data Structures" 1995, Modern Database Systems: The Object Model, Interoperability, and Beyond, Addison Wesley/ACM Press, Reading, MA. pp. 361-358.*

Barroso, Luiz Andre et al., "Web Search for a Planet: The Google Cluster Architecture," IEEE Micro, IEEE Computer Society, Mar.-Apr. 2003, pp. 22-28.

Dean, Jeffrey, et al. "MapReduce: Simplified Data Processing on Large Clusters," Symposium on Operating System Design (OSDI), Dec. 6-8, 2004, San Francisco, California, pp. 1-13.

Foley, James D. et al., Ch. 15, "Visible-Surface Determination," "Computer Graphics: Principals and Practice Second Edition in C," Addison-Wesley (2006), pp. 649-720.

Ghemawat, Sanjay et al., "The Google File System," Association for Computing Machinery (ACM), 19th Symposium on Operating System Principles (SOSP), Oct. 19-22, 2003, Lake George, New York, 15 pages.

Grimm, Cindy, "Technical Report WUCS-2002-9: Creating View-dependent Texture Maps," Nov. 22, 2000, Washington University in St. Louis, Department of Computing Science, 9 pages.

Langley, Richard, B. "The UTM Grid System," GPS World, Feb. 1998, pp. 46-50.

Lawder, J.K. et al., "Using Space-filling Curves for Multi-dimensional Indexing," School of Computer Science and Information Systems, Birkbeck College, University of London, Malet Street, London WC1E 7HX, United Kingdom, 16 pages.

Lindstrom, Peter et al., "An Integrated Global GIS and Visual Simulation System," Mar. 1997. Georgia Institute of Technology: Graphics, Visualization & Usability Center. Technical Report GIT-GVU-97-07, pp. 1-9.

Mesick, H., Ioup, E., Sample, J., "A Faster Technique for the Transformation of Universal Transverse Mercator Projected Raster Images into a Geodetic Projection," Naval Research Laboratory: Memorandum Report, Mar. 11, 2005, 16 pages.

Skodras, A., Christopoulos, C., Ebrahimi, T., "JPEG 2000 Still Image Compression Standard," IEEE Signal Processing Magazine, Sep. 2001, pp. 36-58.

* cited by examiner

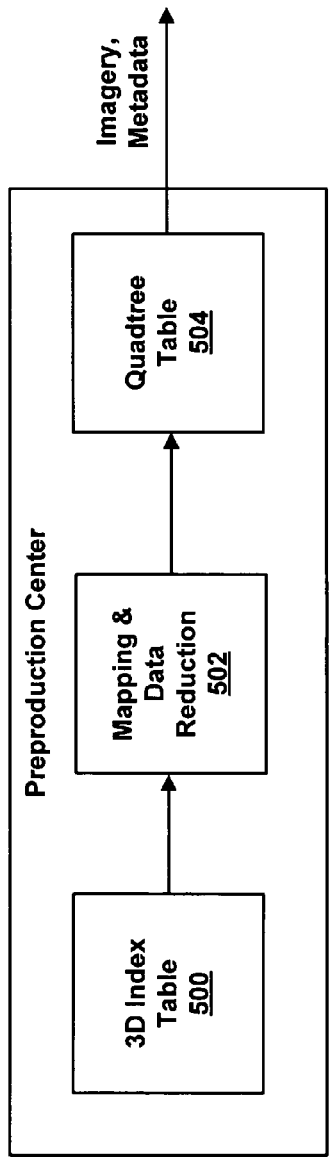

HIERARCHICAL SPATIAL DATA STRUCTURE AND 3D INDEX DATA VERSIONING FOR GENERATING PACKET DATA

RELATED APPLICATIONS

This application is related to co-pending and jointly-owned U.S. patent application Ser. No. 11/415,960, for "Coverage Mask Generation For Large Images," filed May 2, 2006, and Ser. No. 11/437,553, for "Large-Scale Image Processing Using Mass Parallelization Techniques," filed May 19, 2006. Each of these applications is incorporated by reference herein in its entirety.

TECHNICAL FIELD

The subject matter of this application is generally related to image processing.

BACKGROUND

Dramatic improvements in computer processing power and broadband streaming technology have lead to the development of interactive systems for navigating imagery (e.g., map imagery). Some interactive map navigation systems provide a user interface (UI) with navigation controls for dynamically navigating cities, neighborhoods and other terrain in three dimensions. The navigation controls enable users to tilt, pan, rotate, zoom and activate terrain and buildings for different perspectives at a point of interest. An example of an interactive 3D map system for navigating Earth imagery is Google Earth™ developed by Google Inc. (Mountain View, Calif.).

The production imagery used by interactive map navigation systems is typically derived by processing large pieces of geo-located imagery or "assets," which can be taken from a single pass of a satellite or stitched together from multiple aerial photos. Once the imagery is processed it can be moved to datacenters where it can be distributed to client devices.

As a user manipulates the navigation controls of an interactive map system hosted on a client device, the map system will periodically request new imagery, terrain and/or vector data (e.g., gas stations, restaurants, points of interest, etc.) from the datacenters. Prior to making these requests, the map system needs to know if such data is available at the point of interest for the requested level of detail. For example, if a user zooms into a location on the Earth to see more detail, the map system needs to know if data is available, so that such data can be requested from the datacenter. Requesting data from a datacenter when no data is available, or when the data is already available to the mapping system, consumes bandwidth and can be wasteful.

SUMMARY

The disclosed implementations are related to hierarchical spatial data structures with 3D data versioning for generating packet data. The packet data can be used by a client application to determine the availability of data at certain levels of a hierarchical spatial data structure. A 3D index table storing data version information can be used to support data updates and to ensure that a consistent view of data is provided to clients without suffering interruptions in service.

In some implementations, a method includes: determining the availability of a data type at one or more levels of a hierarchical spatial data structure; generating information indicating the availability of the data type at the one or more levels of the hierarchical spatial data structure; and generating a packet that includes the information.

In some implementations, a method includes: receiving imagery; dividing the imagery into tiles, where each tile is associated with tile data; generating a hierarchical spatial data structure for organizing the tile data; and generating information for signaling the availability of a data type at a level in the hierarchical spatial data structure.

In some implementations, a method includes: receiving a data packet including information indicating the availability of one or more data types at one or more levels of a hierarchical spatial data structure; receiving a navigation command generated by a user interacting with a navigation control of an interactive mapping system; and requesting data from a data source in response to the navigation command using the information received in the data packet.

In some implementations, a method includes: updating a plurality of data sources with new data; creating data packets associated with the new data, the data packets including data version identifiers; serving the data packets from at least some of the data sources with an old epoch number; and after all the data sources are serving data packets, updating the epoch number, and serving the data packets with the updated epoch number.

Other implementations of hierarchical spatial data structures and 3D data versioning are disclosed, including but not limited to implementations directed to systems, methods, apparatuses, user interfaces and computer-readable mediums.

DESCRIPTION OF DRAWINGS

FIG. 5A is a block diagram of an exemplary parallel mapping and data reduction process for generating a quadtree table from an index table.

FIG. 5B illustrates an exemplary index table.

FIG. 5C illustrates an exemplary quadtree table.

DETAILED DESCRIPTION

Exemplary Interactive 3D Mapping System

Figure 1:
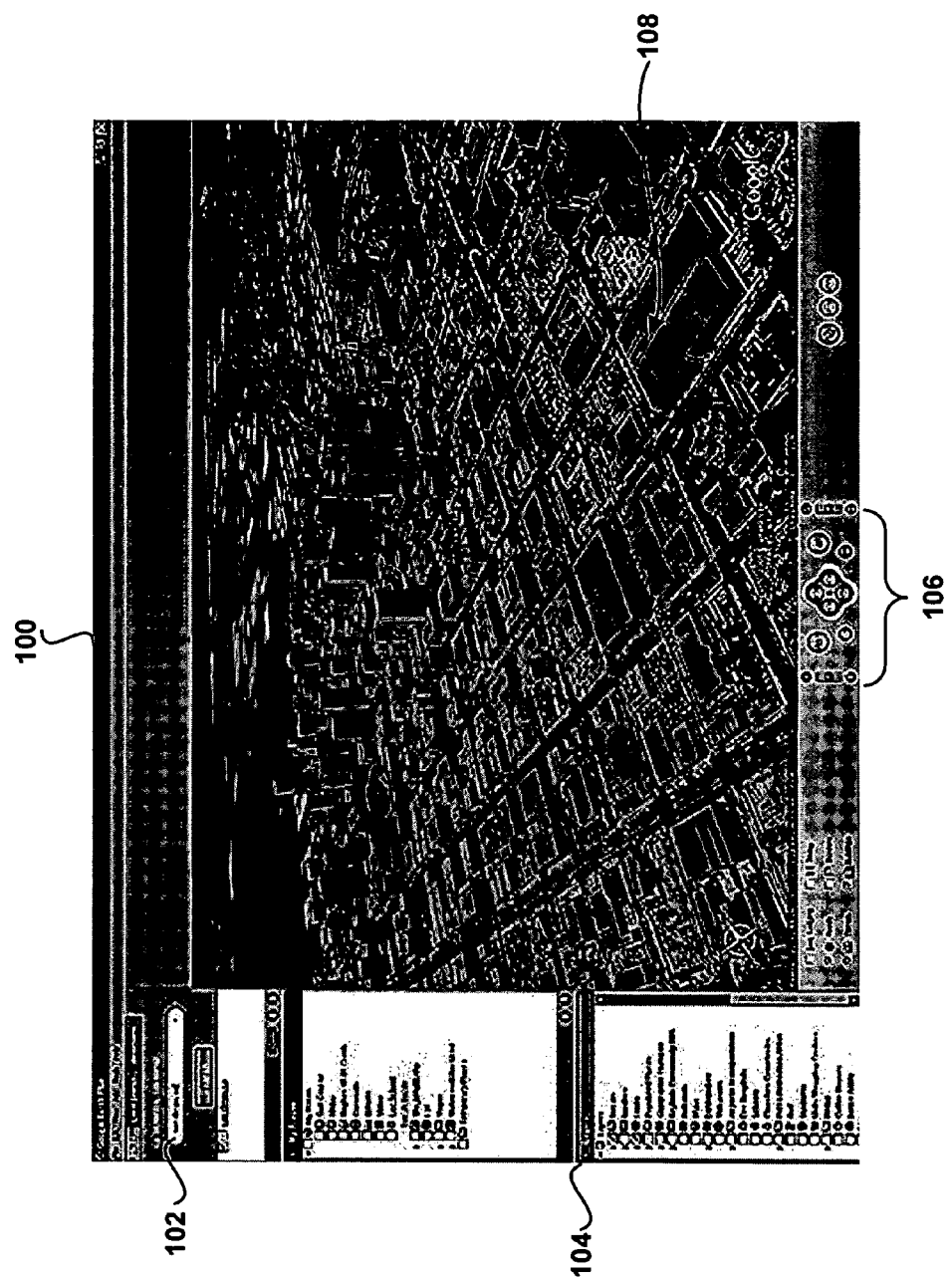
FIG. 1 is a screenshot of an exemplary UI for an interactive 3D Earth mapping system.

FIG. 1 is a screenshot of an exemplary UI 100 for an interactive 3D map system for navigating the Earth. One example of an interactive 3D map system for navigating the Earth is Google Earth™, developed by Google Inc. (Mountain View, Calif.). The UI 100 allows a user to enter a desired location in a search box 102, and then presents imagery of the selected location in a display area 108. A selection pane 104 allows the user to specify one or more layers of information to be displayed with the imagery (e.g., terrain, dining, lodging, gas stations, park and recreation areas, airports and transportation, etc.). The user can operate navigation controls 106 to tilt, pan, rotate and zoom imagery presented in the display area 108 to change the perspective at the selected location.

In some implementations, the UI 100 is generated and presented by a user device. A client application running on the user device can communicate with one or more datacenters over a network (e.g., the Internet, intranet, wireless network, etc.) to retrieve imagery and associated metadata from one or more server systems in the datacenters. Such a client/server architecture reduces the amount of data that a user device stores locally to operate the interactive 3D map system. The imagery provided by datacenters can be generated from raw satellite imagery and other information (e.g., terrain data, vector data, etc.) which is processed before being served to user devices, as described with respect to FIG. 2. As used herein, a "datacenter" is a data source that distributes data to one or more client applications. In some implementations, a datacenter can be a facility housing one or more servers for serving data to clients (e.g., interactive 3D map systems) over a communication channel.

Image Processing and Delivery System

Figure 2:
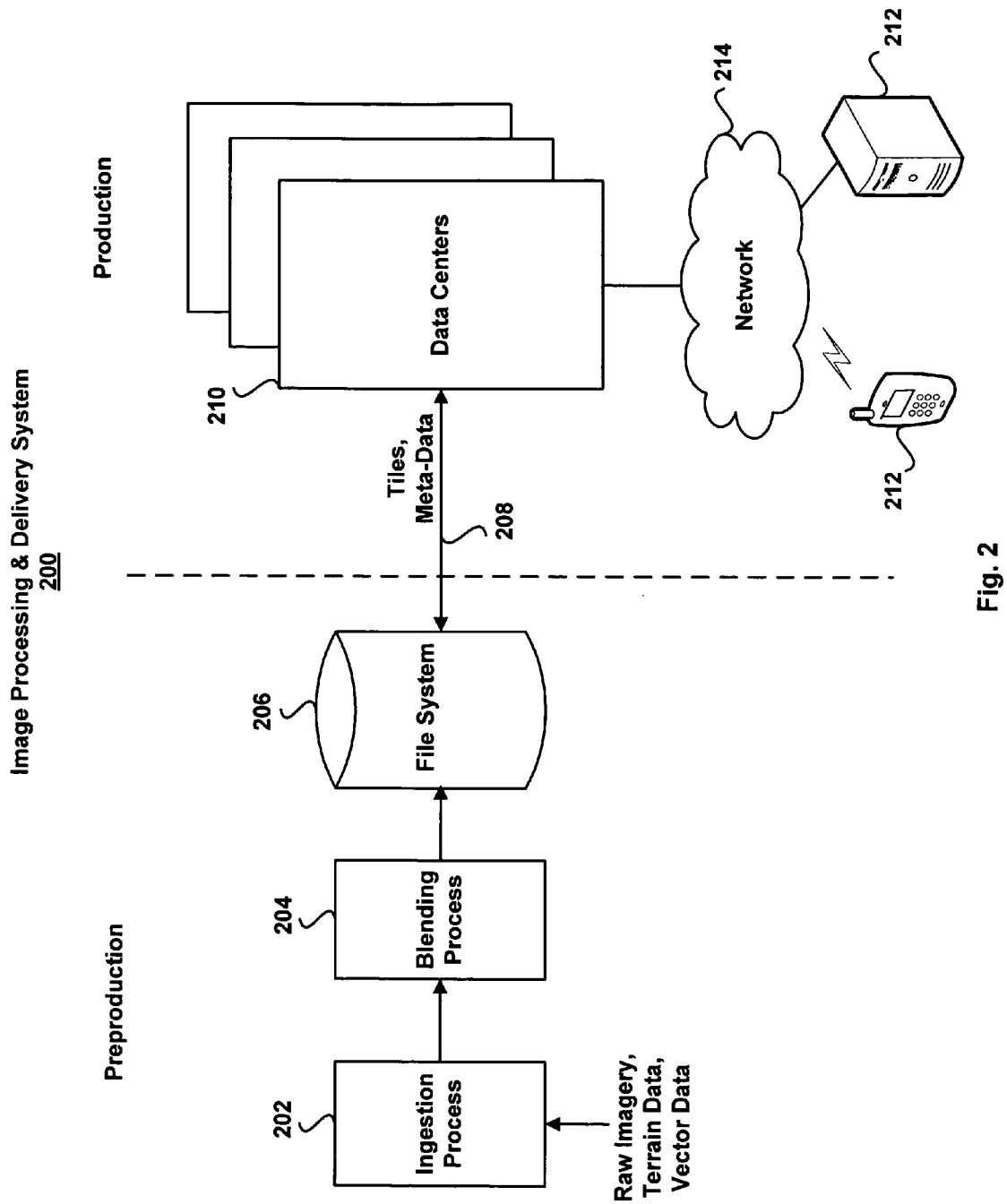
FIG. 2 is a block diagram of an exemplary image processing and delivery system for processing and delivering map imagery to user devices.

FIG. 2 is a block diagram of an exemplary image processing and delivery system 200 for processing and delivering map imagery and associated metadata to user devices 212 (e.g., computers, mobile phones, personal digital assistants (PDAs), game consoles, televisions, consumer electronics, media players, navigation systems, etc.). In some implementations, the system 200 includes a preproduction phase and a production phase. The preproduction phase includes an ingestion process 202 and a blending process 204. The ingestion process 202 performs various image processing on raw imagery, including but not limited to: re-projection, tile generation, coverage and blend mask generation and multi-resolution image and mask pyramid generation, etc. Each of these processes are described more fully with respect FIG. 3.

In some implementations, the blending process 204 orders and blends together processed images generated by the ingestion process 202. The blended image products can be made available to datacenters 210 through a file system 206 and a delivery channel 208. The preproduction phase can be implemented using mass parallelization techniques, as described with respect to FIG. 3.

In the production phase, one or more datacenters 210 retrieve the image products from the file system 206 and deliver the image products to user devices 212 through a network 214 (e.g., Internet, intranet, Ethernet, wireless network, etc.). The image products can include imagery and associated meta-data for one or more locations on the Earth.

User devices 212 can be any electronic device capable of displaying a map, including but not limited to: personal computers (portable or desktop), mobile phones, smart phones, personal digital assistants (PDAs), game consoles, high definition televisions, set-top boxes, navigation systems (e.g., global positioning system (GPS)), avionics displays, etc. The system 200 is exemplary and other configurations and arrangements for image processing and delivery are possible. For example, the ingestion and blending processes could be performed in the datacenters. Also, the tile imagery and metadata could be provided to the datacenters by different sources.

Exemplary Ingestion Process

Figure 3:
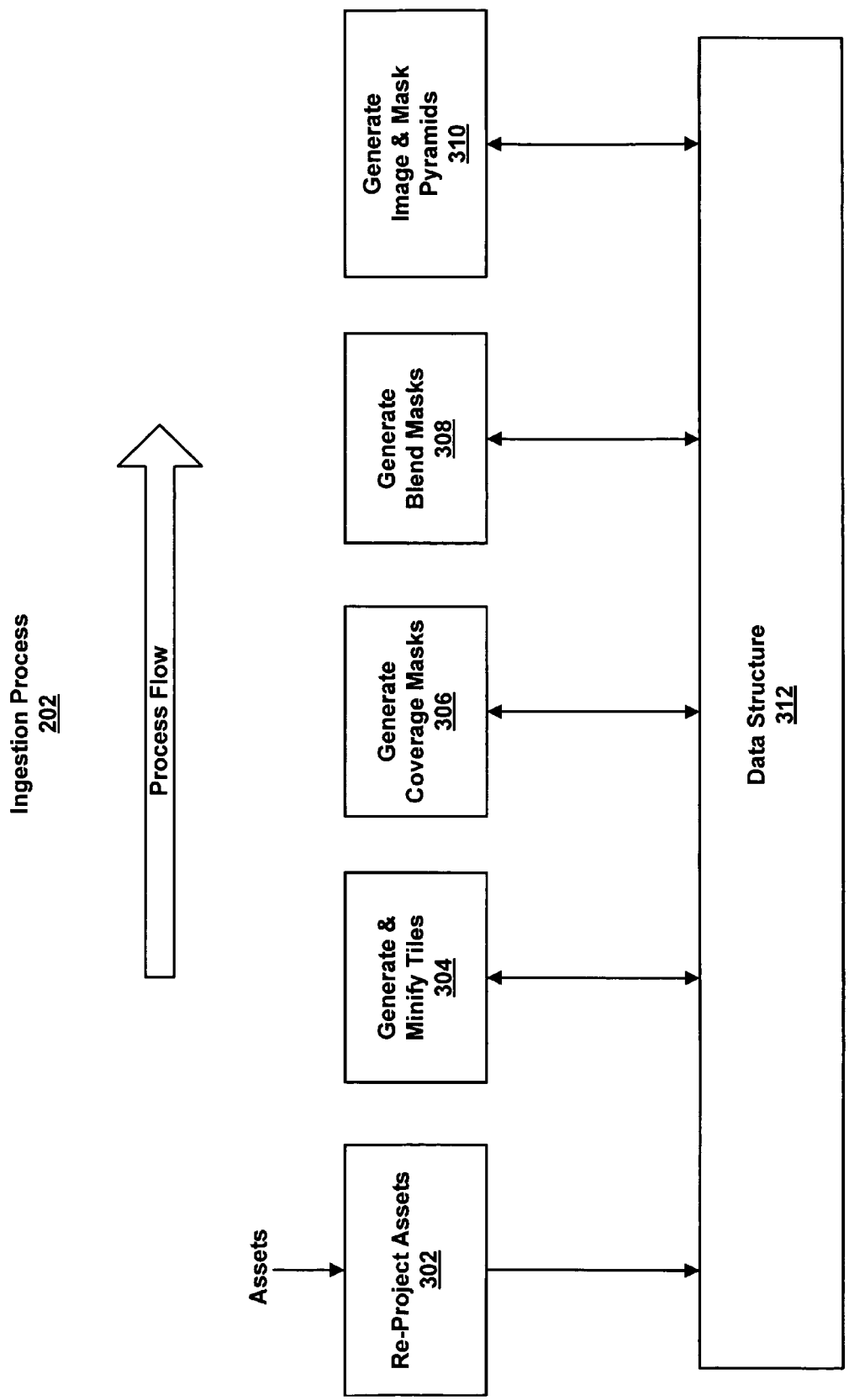
FIG. 3 is a flow diagram of an exemplary ingestion process.

FIG. 3 is a flow diagram of the ingestion process 202 described with respect to FIG. 2. In some implementations, the ingestion process 202 is implemented in a parallel processing infrastructure, which can include hundreds or thousands of commodity computers that are interconnected and configured to perform various image processing operations in parallel.

Large pieces of geo-located imagery are taken from a single pass of a satellite or are stitched together from multiple aerial photos. These raw images or "assets" can be received from one or more sources and can have a variety of orientations. The assets can be re-projected 302 into a suitable coordinate system for the map system (e.g., a geospatial coordinate system) and stored in one or more data structures 312 (e.g., database table). In some implementations, the re-projected assets are divided 304 into tiles which are processed independently in a parallel processing infrastructure. Ideally, tiles are stored so tiles that include imagery for geographic locations that are close to each other have a high probability of being stored on the same machine or in the same machine cluster to reduce the overhead associated with accessing information located on multiple machines. To achieve this ideal condition, the tiles can be sized to fall within the storage constraints of the machines or a cluster of machines. The assets can be divided into any desired shape. A tile shape, however, typically requires less computational and/or representational overhead during processing.

Hierarchical Spatial Data Structure

Figure 4A:
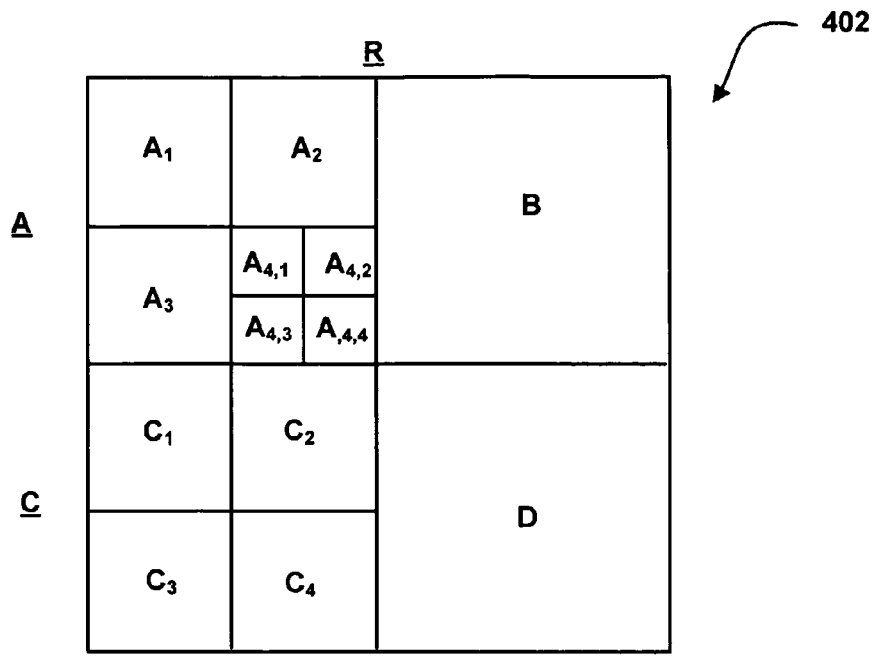
FIGS. 4A and 4B illustrate an exemplary hierarchical spatial data structure and its application to tiled imagery.
Figure 4B:
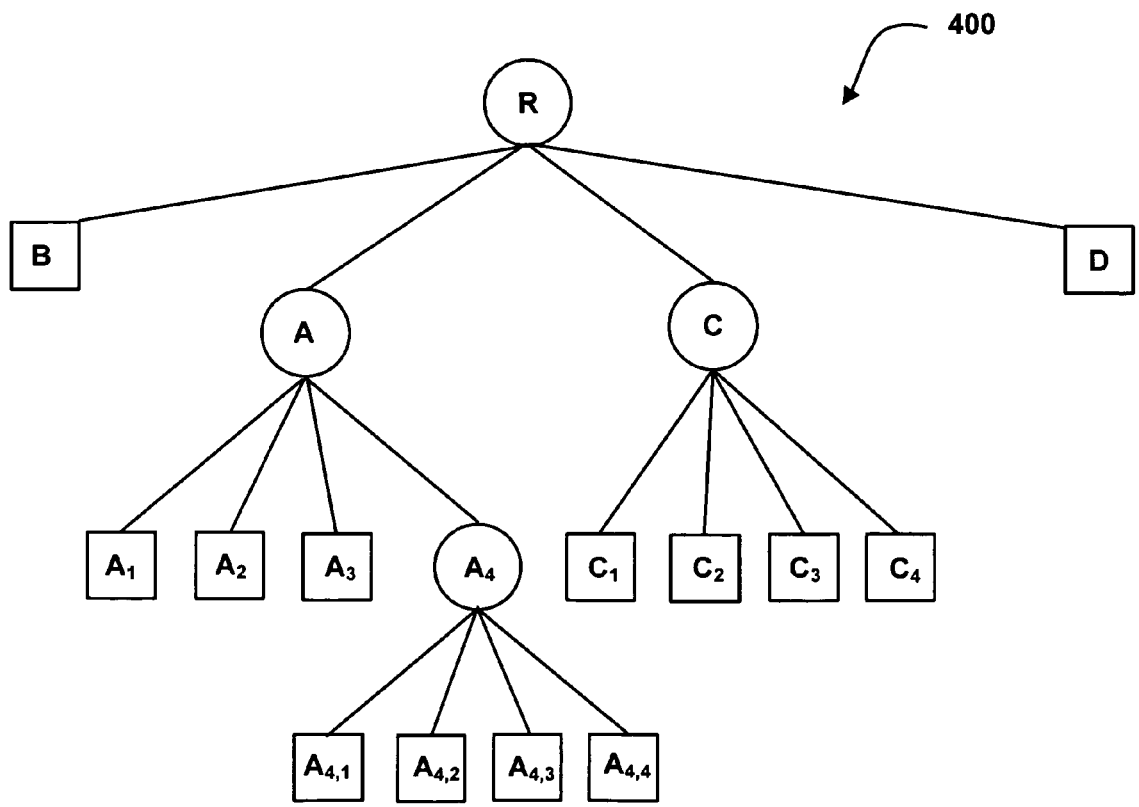

FIGS. 4A and 4B illustrate an exemplary hierarchical spatial data structure 400 and its application to a tile 402 of imagery. In the example shown, the hierarchical spatial data structure 400 is a quadtree. A quadtree is a rooted tree structure where every internal node includes four child nodes. In the example shown, a root node R includes child nodes A, B, C and D. Each of the internal child nodes A and C has four child nodes. For example, internal child node A has four child nodes: $A_1, A_2, A_3$ and $A_4$. Likewise, internal child node C has four child nodes: $C_1, C_2, C_3$ and $C_4$. Following this pattern, the internal child node $A_4$ has four child nodes: $A_{4,1}, A_{4,2}, A_{4,3}$ and $A_{4,4}$. While only two levels of the quadtree data structure 400 are shown, the quadtree data structure 400 can have any desired number of levels depending on the application. The quadtree data structure 400 is a well-known hierarchical data structure that has a variety of useful properties. Quadtree data structures are described in Foley, James D. et al., "Computer Graphics: Principals and Practice Second Edition in C," Addison-Wesley (2006), Ch. 15, which is incorporated by reference herein in its entirety.

The quadtree data structure 400 is particularly well-suited for storing imagery and associated metadata. In the example shown, the root R of the quadtree data structure 400 can be mapped to the tile 402. The tile 402 can be generated as described in reference to FIG. 3. The tile 402 can be further divided into four quadrants A, B, C, D, each of which can be mapped to child nodes A, B, C and D of the quadtree data structure 400. Each of the four quadrants A, B, C, D can be further divided into four quadrants and so forth. Thus, there can be a direct mapping between nodes in the quadtree data structure 400 and quadrants in the tile 402. In the example shown, the quadrants $A_{4,1}, A_{4,2}, A_{4,3}$ and $A_{4,4}$ in the tile 402 map to nodes $A_{4,1}, A_{4,2}, A_{4,3}$ and $A_{4,4}$ in the quadtree data structure 400.

In the description that follows, the nodes of a quadtree will be referred to as quadnodes. Additionally, a quadnode plus J levels of its descendents will be referred to as quadsets. The number of quadnodes N in a quadset is defined by $$N = \sum_{k=0}^{J} 4^k.$$

The number of levels J is an implementation choice and can be any desired value. For example, if J=3 then a single quadset will have 85 nodes. As will be described later, quadsets are used to improve efficiency of communication of data to a client.

Quadtree Table Builder

FIG. 5A is a block diagram of an exemplary mapping and data reduction process for generating a quadtree table 504 from an index table 500. As previously described in reference to FIG. 3, imagery undergoes an ingestion process 202. During the ingestion process 202 assets are divided into tiles which undergo various process steps to generate coverage masks, blend masks, minified fragments, etc. The processing of tiles generates data that is stored in a data structure 312 (e.g., a file system). In a parallel processing infrastructure, data files can be distributed over thousands of interconnected machines (e.g., personal computers networked together). The index table 500 can be used to provide access to the data.

In some implementations, tile imagery and metadata are associated with quadnodes of a quadtree data structure. The locations of the files that store the data for each quadnode can be stored in the index table 500, as shown in FIG. 5B. In some implementations, the "data location" column in the index table 500 can include numbers rather than filenames to reduce storage or memory requirements. The numbers can be used to index into a table of files at the datacenter.

In the example shown, the index table 500 can include a row for each of N quadnodes in the quadtree data structure. Each row can include data for several epochs, as described in reference to FIG. 7. The name of the row can be the name of a single quadnode or it can have a different name. The contents of each row can include a data version number and file location (e.g., a pathname plus a filename) where the quadnode data is stored. Quadnode data can include any desired data, including but not limited to imagery, terrain and vector data. Vector data can be overlaid on the imagery at designated locations for various levels or layers of detail. Some examples of vector data include information related to gas stations, restaurants, points of interest and the like. The files can be part of a global file system, such as the file system described in Ghemawat, Sanjay et al., "The Google File System," Association For Computing Machinery (ACM), 19$^{th}$ Symposium on Operating System Principles (SOSP), Oct. 19-22, 2003, Lake George, N.Y., which article is incorporated by reference herein in its entirety.

In some implementations, clients periodically request data from datacenters or other data sources while the user navigates imagery. For example, a user may zoom-in on a particular point of interest on the Earth, which can result in a request to a datacenter server for more detailed data for the targeted zoom level. The datacenter can respond by serving the requested data to the client. In some implementations, data is served in quadtree packets, which can include data for one or more quadsets. In some implementations, a quadtree packet can contain version numbers for imagery, terrain data and vector data, if such data is available. For nodes at the bottom level of a quadset, "child" presence information (e.g., a flag or other indicator) can be included to indicate whether any data is present at the quadset below a given node in the quadtree (hereinafter also referred to as a "child quadset"). The quadree packet can also include header information that indicates the size of the packet and any other desired data (e.g., cyclic redundancy check (CRC) information).

Unlike imagery and terrain data, there are potentially hundreds of "layers" of vector data that need to be transferred to client devices. Examples include road data, restaurants, parks, etc. In some implementations, each vector data can be one layer of data that is associated with a version number.

Quadsets can be used to improve efficiency when communicating data from datacenters to clients, since a quadset includes data for J levels of descendents of a quadnode. If the user continues to zoom-in on the point of interest, the new data for the new resolution level can be retrieved from local cache at the user device because it was previously delivered to the client in a quadtree packet. If quadtree packets were to include data for a single quadnode, then the same zooming action could require multiple quadtree packet transactions with one or more datacenters, resulting in diminished system performance.

In a large-scale mass parallelization infrastructure, data can be mapped and collected in a preproduction center using mapping and data reduction processes 502. Exemplary mapping and data reduction processes are described in Dean, Jeffrey, et al., "MapReduce: Simplified Data Processing on Large Clusters," Symposium on Operating System Design (OSDI), Dec. 6-8, 2004, San Francisco, Calif., which article is incorporated by reference in its entirety.

In the example shown in FIG. 5A, each row of the index table 500 is read by a mapping and data reduction process 502 and written to the quadtree table 504. In some implementations, each row of the quadtree table 504 is a quadset and includes data associated with the quadset (e.g., the quadtree data for 85 quadnodes), as shown in FIG. 5C. The name of the row can be the root node of the quadset. For example, the first row of the quadtree table 504 could include data associated with quadset 1, the second row could include data associated with quadset 2 and so forth. The index table 500 and quadtree table 504 can be stored on any suitable computer-readable medium (e.g., hard disk, memory, optical disk, etc.). Each row of the index table 500 and quadtree table 504 can include data for several epochs, as described in reference to FIG. 7. The mapping and data reduction process 502 is described with respect to FIG. 6.

While the description above is in reference to quadtree data structures, other hierarchical spatial data structures can be used in the disclosed implementations, such as octrees, k-d-trees, b-trees, by-trees and BSP-trees.

Mapping and Reduction Processes

Figure 6:
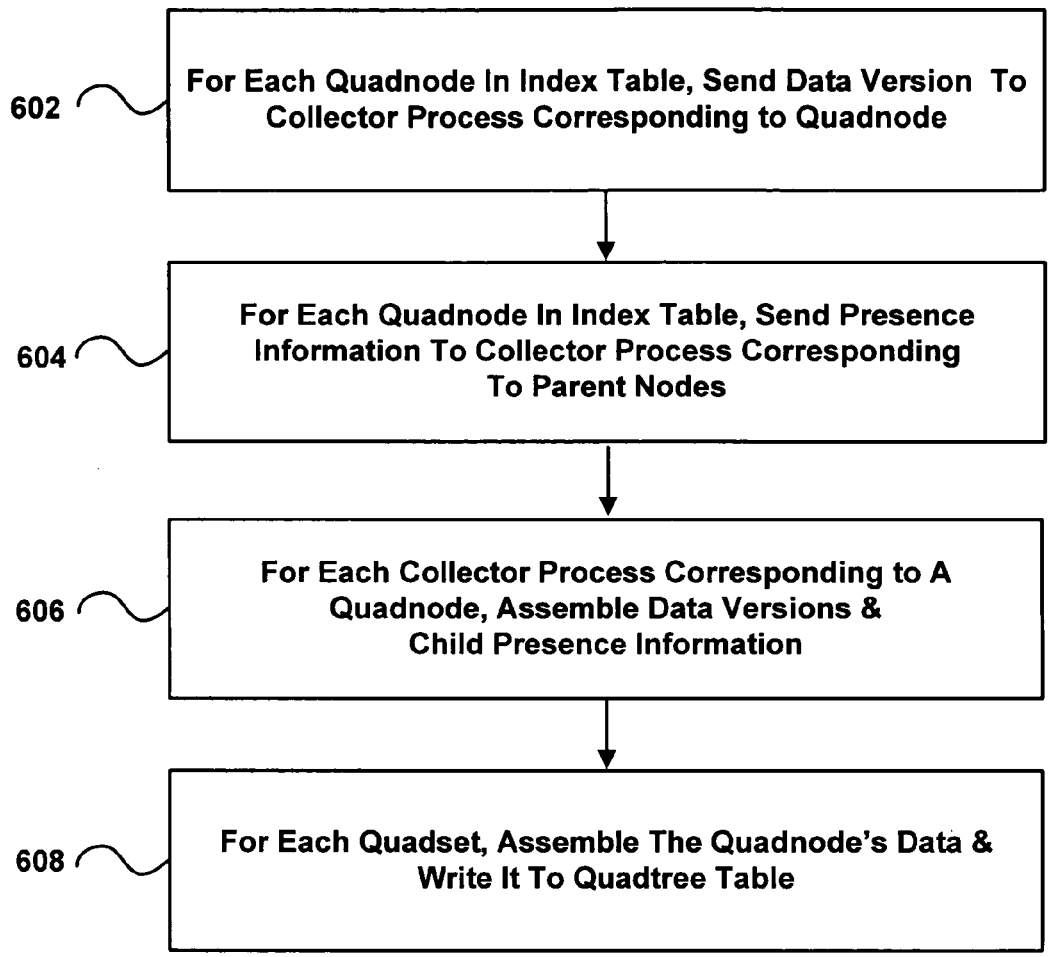
FIG. 6 is a flow diagram of an exemplary quadtree packet generation process.

FIG. 6 is a flow diagram of an exemplary mapping and reduction process 600. In some implementations, the process 600 can be implemented using a massively parallel processing architecture, such as the architecture described in Barroso, Luiz Andre' et al., "Web Search For A Planet: The Google Cluster Architecture," IEEE Micro, IEEE Computer Society, March-April 2003, which article is incorporated by reference herein in its entirety.

For each quadnode in the index table, the data version associated with the quadnode is sent to a collector process corresponding to the quadnode (602). The collector process can be, for example, a "worker" process, as described in Dean, Jeffrey, et al., "MapReduce: Simplified Data Processing on Large Clusters," Symposium on Operating System Design (OSDI), Dec. 6-8, 2004, San Francisco, Calif. Additionally, presence information can be sent to the collector process for every "parent" quadnode (604). This process can be described in pseudocode as follows:

for each quadnode N in the index table
    for each quadset S between N and the root of the quadtree send presence information for N to S.

The presence information indicates the availability of data at the descendent quadnodes below the parent quadnodes in the quadtree data structure. Presence information can be implemented using a variety of data types including bits, flags, strings, etc. Table I below illustrates one example of a data structure for transmitting presence information in a quadtree packet for a quadset having 2 levels (i.e., J=2). The data structure can be implemented, for example, as one or more bit fields in a header or payload portion of a quadtree packet.

TABLE I

Exemplary Data Structure For Presence Information

| | Quadnode | | | | |
|---|---|---|---|---|---|
| | 1 | 2 | 3 | 4 | 5 |
| Imagery | 1 | 1 | 1 | 1 | 0 |
| Terrain | 1 | 1 | 1 | 0 | 0 |
| Vector | 1 | 0 | 1 | 0 | 0 |

Referring to Table I, a "1" indicates the presence of data and a "0" indicates the absence of data. At level 1, the presence information indicates that imagery, terrain and vector data are available. At level 2, the presence information indicates that imagery and terrain data are available. At level 3, the presence information indicates that only imagery data is available.

Other data structures for presence information are possible. For example, the presence information can be data version numbers rather than a bit. Representing presence information with data version numbers can be useful in systems where the client requesting the quadtree packet uses the version number in its request for data. In addition to version numbers, nodes at the bottom level of a quadset can be associated with "child" presence information that indicate whether there is any data below a given node in the quadtree. Clients can use "child" presence information to determine whether they should request data below a given node in the quadtree. For example, if the user zooms in closer on a point of interest while navigating, the client can use the "child" presence information to determine whether data is available at the level of detail requested by the user. If data is available, the client can request the data from a datacenter. The "child" presence information can be represented in a variety of formats, including one or more bits, variables, keys, logical operators, strings, etc.

Referring again to FIG. 6, for each collector process corresponding to a quadnode, data versions and presence information are collected and assembled (606). The assembled quadnode data is assembled into quadsets and written to a quadtree table (608).

Imagery and metadata can be read from the preproduction center and delivered to one or more datacenters, where it can be used to populate an index table (e.g., the row name and filename for each image). At each datacenter, data mapping and reduction processes can be used to create quadtree packets (including presence information) in a quadtree table that can be served to clients, as described in reference to FIGS. 6, 7 and 8. In some implementations, only the quadnodes at the bottom level of a quadset provide presence information, since the client may already know if data is available below the top three levels of the quadset. For example, if the number of levels in a quadset is 3, then only the 64 quadnodes at the bottom level of the quadset will provide presence information.

In some implementations, the presence information is generated by the "mapping" and "reduce" phases of the process 600. In the "mapping" phase, each quadnode N in the index table sends version numbers for its data (e.g., imagery, terrain and vector data) to a worker process assigned to the quadset containing N. Additionally, during the "mapping" phase, each node N in the index table sends a "child" indicator to a worker process assigned to each quadset above N in the quadtree. In the "reduce" phase, a worker process for a quadset S combines the version numbers and child flags for each node in S into a quadtree packet, and writes the packet into the quadtree table at row S. If necessary, an empty quadnode can be created in the quadset that includes information for indicating the presence of data further down the quadtree.

3D Index for Data Versioning

Figure 7:
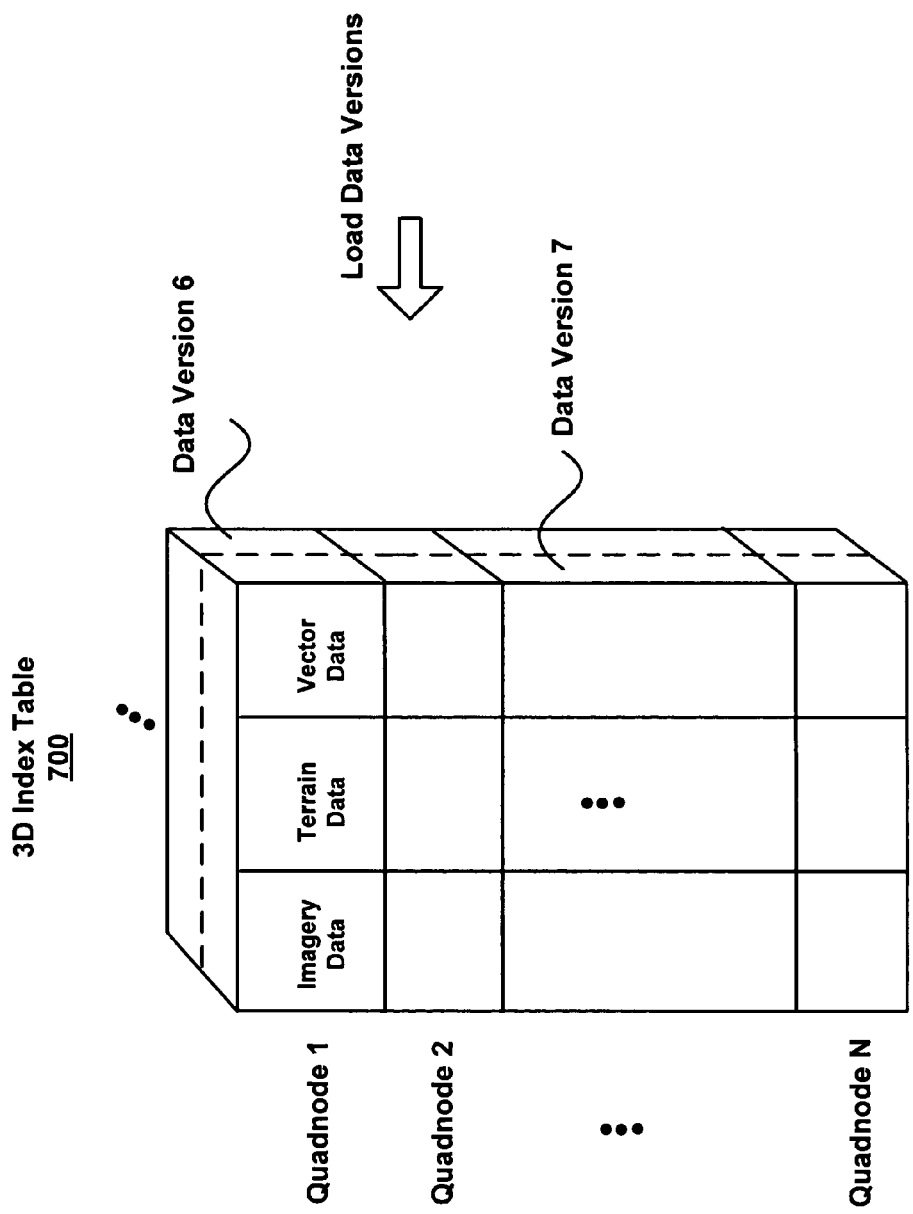
FIG. 7 illustrates a 3D index table for data versioning.

FIG. 7 illustrates a 3D index table 700 for data versioning. In some implementations, imagery, terrain and vector data can be associated with a version number. The largest version number (i.e., latest version) is referred to as the "epoch" number. The imagery, terrain and vector data can be periodically updated in datacenters. Such updates can be performed while servers are providing data to clients. Moreover, data can be served to a single client from multiple datacenters during an update. In some implementations, each row of the 3D index 700 represents a quadnode in a quadtree and each column represents a data type (e.g., imagery, terrain, vector layers, etc.). The "3D" nature of the 3D index 700 results from its ability to handle multiple data versions, as shown in FIG. 7.

In some implementations, a cache system can be used to support data updates and present a consistent view of the data to a user without suffering interruptions. In such implementations, version numbers can be assigned to the data, which can be transmitted in quadtree packets separately from actual imagery, terrain and vector data. Also, at least two versions of data (e.g., an "old" and "new" version) can be served to different clients.

In such implementations, there is a possibility that old and new data will be served to a client from different datacenters that are at different stages of the update process, which could result in the display of artifacts at old/new data boundaries. If during an update a client navigates into an area on Earth for which its cache does not have data, then the client can request data for that area. When the data is received, some clients may tag the data with an old version number. For example, a client may tag the new data, with a version number associated with old data stored in cache. To avoid a client tagging old data with a new version number (essentially poisoning its cache), a special data loading process 800 can be performed, as described in reference to FIG. 8.

Data Update Process

Figure 8:
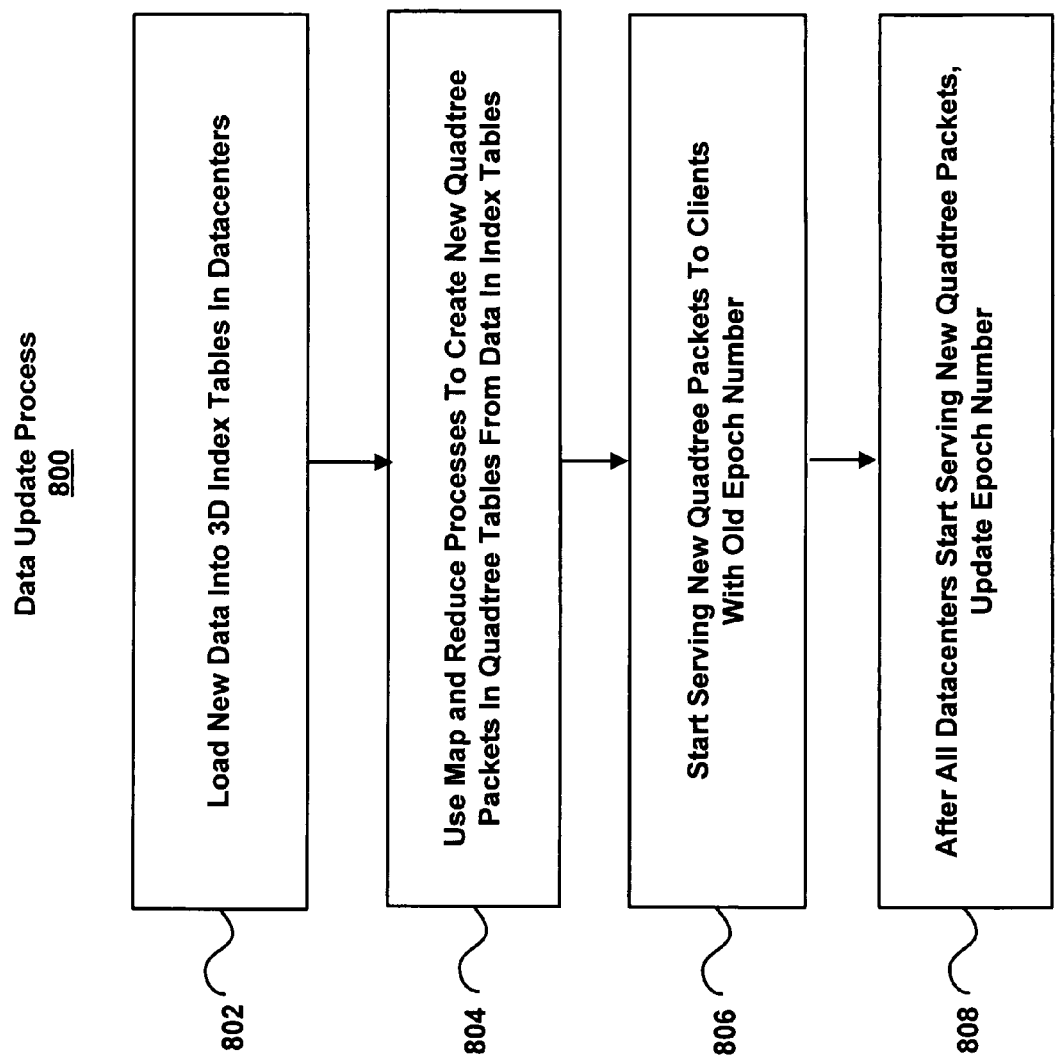
FIG. 8 is a flow diagram of an exemplary data update process.

FIG. 8 is a flow diagram of an exemplary data update process 800. The process 800 is designed to avoid old data being tagged with a new epoch number, which could happen if a client gets data from different datacenters operating at different points in the data updating process. Such a scenario could result in the client rendering a combination of old and new data. In the process description that follows, "data" refers to quadtree packets containing version numbers and not to actual imagery, terrain or vector data.

The process 800 is similar to the preproduction process described in reference to FIG. 5A. The process 800 begins by loading new data into the index tables at every datacenter (802). Using map and reduce processes, new quadtree packets are created in quadtree tables in the datacenters from the data in the index tables (804). Examples of index and quadtree tables were previously described in reference to FIGS. 5B and 5C. Next, the datacenters can start serving new data to clients with an old epoch number (806). After every datacenter starts serving new data, the epoch number can be updated (808). After the epoch number has been updated, the client will see that some of the new data has the old epoch number, and it will request the data again from the datacenters. When the data is received, the client can tag the data with the new epoch number, causing the client's cache to get flushed for areas with new data.

Various modifications may be made to the disclosed implementations and still be within the scope of the following claims.

What is claimed is:

1. A method comprising:
    determining, at a server computer, availability of each of a plurality of data types of one or more tiles of an interactive map, wherein the tiles are arranged into multiple levels of a hierarchical spatial data structure;
    generating a packet including presence information, wherein the presence information indicates to a client computer availability of each of the plurality of data types of one or more tiles at one or more levels of the hierarchical spatial data structure and version information for each data type;
    serving the packet including presence information to the client computer;
    after serving the packet including presence information to the client computer, receiving a request for data associated with one or more tiles identified by the presence information as being available; and
    providing the requested data in response to the request, wherein the method steps are performed by one or more processors.

2. The method of claim 1, wherein determining availability of each of a plurality of data types comprises determining availability of a version of one or more of the data types of the one or more tiles at the one or more levels of the data structure.

3. The method of claim 1, wherein the hierarchical spatial data structure is a quadtree and the method further comprises:
    generating an index table having rows corresponding to quadnodes in the quadtree, wherein each of the one or more tiles corresponds to a quadnode of the quadtree, and wherein the presence information is based at least in part on data in the index table.

4. The method of claim 3, further comprising:
    generating a quadtree table from the index table, the quadtree table having rows corresponding to quadsets in the quadtree, wherein the presence information is based at least in part on data in the quadtree table.

5. The method of claim 4, wherein generating presence information comprises:
    for each quadnode N in the index table,
    collecting information for each quadset S between quadnode N and a quadtree root, wherein the presence information includes the collected information.

6. The method of claim 1, wherein the generated packet includes presence information for a quadset including a particular quad node and multiple levels of nodes descendent from the particular quad node.

7. The method of claim 1, further comprising:
    receiving a request from the client computer for one or more types of data at a particular level of the hierarchical spatial data structure; and
    in response to the request, serving the requested data to the client computer.

8. A method comprising:
    receiving, at a client computer, a data packet including presence information, wherein the presence information indicates to the client computer availability of each of a plurality of data types of one or more tiles of an interactive map, wherein the tiles are arranged into multiple levels of a hierarchical spatial data structure;
    receiving, at the client computer, a first user navigation command of the interactive mapping system, the command requesting data of a particular tile at a particular level of the hierarchical spatial data structure;
    determining from the presence information received in the data packet, that data of the particular tile is available; and
    in response to determining from the presence information that the data of the particular tile is available, requesting data of the particular tile from the server computer in response to the first user navigation command,
    wherein the determining is performed by one or more processors.

9. The method of claim 8, wherein the plurality of data types of presence information include imagery data, terrain data, and vector data.

10. A computer-readable storage device having stored thereon instructions, which, when executed by a processor, causes the processor to perform operations comprising:
    determining, at a server computer, availability of each of a plurality of data types of one or more tiles of an interactive map, wherein the tiles are arranged into multiple levels of a hierarchical spatial data structure;
    generating a packet including presence information, wherein the presence information indicates to a client computer availability of each of the plurality of data types of one or more tiles at one or more levels of the hierarchical spatial data structure;
    serving the packet including presence information to the client computer;
    after serving the packet including presence information to the client computer, receiving a request for data associated with the one or more tiles identified by the presence information as being available; and
    providing the requested data in response to the request.

11. The computer-readable storage device of claim 10, wherein determining availability of each of a plurality of data types comprises determining availability of a version of one or more of the data types of the one or more tiles at the one or more levels of the data structure.

12. The computer-readable storage device of claim 10, wherein the hierarchical spatial data structure is a quadtree and the instructions further cause the processor to perform operations comprising:
    generating an index table having rows corresponding to quadnodes in the quadtree, wherein each of the one or more tiles corresponds to a quadnode of the quadtree, and wherein the presence information is based at least in part on data in the index table.

13. The computer-readable storage device of claim 12, further comprising:
    generating a quadtree table from the index table, the quadtree table having rows corresponding to quadsets in the quadtree, wherein the presence information is based at least in part on data in the quadtree table.

14. The computer-readable storage device of claim 13, where generating presence information comprises: for each quadnode N in the index table, collecting information for each quadset S between quadnode N and a quadtree root, wherein the presence information includes the collected information.

15. A computer-readable storage device having stored thereon instructions, which, when executed by a processor, cause the processor to perform operations comprising:

receiving, at a client computer, a data packet including presence information, wherein the presence information indicates to the client computer availability of each of a plurality of data types of one or more tiles of an interactive map, wherein the tiles are arranged into multiple levels of a hierarchical spatial data structure;

receiving, at the client computer, a first user navigation command of the interactive mapping system, the command requesting data of a particular tile at a particular level of the hierarchical spatial data structure;

determining from the presence information received in the data packet, that data of the particular tile is available; and in response to determining from the presence information that the data of the particular tile is available, requesting data of the particular tile from the server computer in response to the first user navigation command.

16. A system comprising:

one or more processors; and a computer storage medium storing instructions that, when executed by the one or more processors, cause the one or more processors to perform operations comprising:

determining, at a server computer, availability of each of a plurality of data types of one or more tiles of an interactive map, wherein the tiles are arranged into multiple levels of a hierarchical spatial data structure;

generating a packet including presence information, wherein the presence information indicates to a client computer availability of each of the plurality of data types of one or more tiles at one or more levels of the hierarchical spatial data structure;

serving the packet including presence information to the client computer;

after serving the packet including presence information to the client computer, receiving a request for data associated with the one or more tiles identified by the presence information as being available; and providing the requested data in response to the request.

17. The method of claim 1, wherein a data type is one or more of imagery data, terrain data, and vector data.

* * * * *